United States Patent
Wan et al.

(10) Patent No.: US 9,958,074 B2
(45) Date of Patent: May 1, 2018

(54) VALVE SEAT RING AND MULTI-WAY VALVE HAVING VALVE SEAT RING

(71) Applicant: KELAMAYI KING-BULL INFORTEC PETROLEUM EQUIPMENT CO., LTD., Kelamayi, Xinjiang (CN)

(72) Inventors: Mingmin Wan, Kelamayi (CN); Jianshe Yao, Kelamayi (CN); Zhi Gao, Kelamayi (CN); Yunzhao Chen, Kelamayi (CN); Liyun Zhu, Kelamayi (CN)

(73) Assignee: KELAMAYI KING-BULL INFORTEC PETROLEUM EQUIPMENT CO., LTD., Kelamayi, Xinjiang (CN)

( * ) Notice: Subject to any disclaimer, the term of this patent is extended or adjusted under 35 U.S.C. 154(b) by 0 days. days.

(21) Appl. No.: 15/317,769

(22) PCT Filed: Aug. 21, 2014

(86) PCT No.: PCT/CN2014/084929
§ 371 (c)(1),
(2) Date: Dec. 9, 2016

(87) PCT Pub. No.: WO2015/188452
PCT Pub. Date: Dec. 17, 2015

(65) Prior Publication Data
US 2017/0130850 A1    May 11, 2017

(30) Foreign Application Priority Data
Jun. 10, 2014 (CN) .......................... 2014 1 0256679

(51) Int. Cl.
*F16K 11/072* (2006.01)
*F16K 11/074* (2006.01)
(Continued)

(52) U.S. Cl.
CPC ............. *F16K 11/074* (2013.01); *E21B 34/00* (2013.01); *F16K 25/00* (2013.01); *F16K 5/168* (2013.01);
(Continued)

(58) Field of Classification Search
CPC .. F16K 11/0743; F16K 11/072; F16K 11/074; F16K 11/0856; F16K 5/168; F16K 5/188; F16K 5/205; Y10T 137/86863
(Continued)

(56) References Cited

U.S. PATENT DOCUMENTS 2,821,998 A * 2/1958 Mayhew ............... F16K 11/085
137/625.11
2,840,109 A    6/1958 Wadleigh
(Continued)

FOREIGN PATENT DOCUMENTS

CN        2709740 Y     7/2005
CN      201034178 Y     3/2008
(Continued)

OTHER PUBLICATIONS

International Search Report for PCT/CN2014/084929, dated Feb. 2, 2015, 6 pages.

*Primary Examiner* — Matthew W Jellett
*Assistant Examiner* — Christopher Ballman
(74) *Attorney, Agent, or Firm* — Nixon & Vanderhye P.C.

(57) ABSTRACT

The multi-way valve comprises an upper valve body, a lower valve body and a rotary valve core. A valve seat ring is located in the rotary valve core and comprises a body. A first annular boss is arranged on an outer wall of the body, and a second annular boss is arranged on an inner wall. The upper surfaces of the first annular boss and the second annular boss are respectively flush with the upper surface of the body to form a sealing surface which fits with a sealing
(Continued)

surface of the upper valve body in a sealed manner. An annular gap is formed between the lower surface of the first annular boss and the rotary valve core, so that liquid in the chamber and an oil incoming channel respectively acts on the lower surface of the first annular boss or the second annular boss to form a sealing load.

8 Claims, 4 Drawing Sheets

(51) Int. Cl.
    *E21B 34/00*     (2006.01)
    *F16K 25/00*     (2006.01)
    *F16K 5/20*     (2006.01)
    *F16K 5/18*     (2006.01)
    *F16K 11/085*     (2006.01)
    *F16K 5/16*     (2006.01)

(52) U.S. Cl.
    CPC .............. *F16K 5/188* (2013.01); *F16K 5/205* (2013.01); *F16K 11/072* (2013.01); *F16K 11/0743* (2013.01); *F16K 11/0856* (2013.01); *Y10T 137/86863* (2015.04)

(58) Field of Classification Search
    USPC .................. 137/625.46, 625.4; 251/172, 360
    See application file for complete search history.

(56) References Cited

U.S. PATENT DOCUMENTS

| | | | |
|---|---|---|---|
| 2,996,083 A | 8/1961 | Huska | |
| 4,989,641 A * | 2/1991 | Jones | F16K 11/085 137/625.11 |
| 5,927,330 A * | 7/1999 | Minton | F16K 11/076 137/625.11 |
| 6,427,932 B1* | 8/2002 | Danckert | F02M 61/18 123/467 |
| 7,343,933 B2* | 3/2008 | McBeth | F16K 11/074 137/625.11 |
| 8,100,143 B2* | 1/2012 | Wan | E21B 34/02 137/625.11 |
| 9,228,664 B2* | 1/2016 | Partridge | F16K 11/0856 |
| 2005/0194053 A1* | 9/2005 | Jeromson | F16K 11/0743 137/897 |

FOREIGN PATENT DOCUMENTS

| | | |
|---|---|---|
| CN | 201173313 Y | 12/2008 |
| CN | 201875189 U | 6/2011 |
| CN | 102466059 A | 5/2012 |
| CN | 203036009 U | 7/2013 |
| CN | 204025764 U | 12/2014 |
| JP | 6-174118 A | 6/1994 |
| NL | 7607014 A | 12/1977 |

* cited by examiner

VALVE SEAT RING AND MULTI-WAY VALVE HAVING VALVE SEAT RING

This application is the U.S. national phase of International Application No. PCT/CN2014/084929 filed 21 Aug. 2014, which designated the U.S. and claims priority to CN Patent Application No. 201410256679.0 filed 10 Jun. 2014, the entire contents of each of which are hereby incorporated by reference.

TECHNICAL FIELD

The invention relates to a valve seat ring, and more particularly to a valve seat ring on a multi-way valve of a petroleum, chemical engineering and natural gas metering station and a multi-way valve having the valve seat ring.

BACKGROUND OF THE INVENTION

A multi-valve is generally used for taking turns metering single well production of the well, in order to obtain dynamic well production data. The valve core of the multi-way valve is provided with a valve seat ring, and the sealing surface of the valve seat ring is closely fitted with a sealing surface of the upper valve body. Currently, the sealing surface of the existing valve seat ring is welded/surfacing welded with cemented carbide or cermet, such as what is disclosed in the Chinese patent application ZL200420006528.1, Chinese patent application ZL200620167076.4 and Chinese patent application ZL200920291629.0.

In the normal operation of the multi-way valve, the valve seat ring makes circular motion around a shaft core of the valve core on the sealing surface of the upper valve body, and the sealing pressure ratio of the sealing surface of the valve seat ring to the sealing surface of the upper valve body is mainly provided by a disc spring, therefore, due to the limitations of the elastic force of the disc spring, the existing multi-way valve can only meet the requirement of internal sealing test under low differential-pressure (DP). When the testing differential-pressure (DP) between the gathering and transportation orifice and the metering orifice of a multi-way valve is up to 6.9 MPa, i.e., 1000 psi or even higher, it is far from meeting the leakage requirements of Leakage Level ANSI FCI-70.2 VI by providing the sealing pressure ratio only by the disc spring. Moreover, as for the structure of the traditional valve seat ring, the sealing band on sealing surface thereof is relatively wide, which results in that the force bearing area of the sealing is too large, and the power necessary to attain the sealing pressure ratio required by the sealing of Level VI is large. In this way, as the moment needed to be provided to drive the valve core to rotate becomes larger, especially under the working condition of high pressure, the larger the driving moment is, the larger the shaft diameter of the shaft core needed for transmitting the moment is, which is bad for the structural design of the valve body of the multi-way valve and it needs to select driving electronic assembly with higher power.

SUMMARY OF THE INVENTION

In view of the above-mentioned problems existing in the prior art, the technical problem to be solved by the present invention is to provide a valve seat ring capable of realizing self-adaptive sealing by hydraulic pressure, so as to improve the internal sealing pressure ratio of the multi-way valve and meet the requirements for sealing level under high differential-pressure.

In order to solve the above technical problem, the present invention adopts the following technical solution: a valve seat ring for use in a multi-way valve, the multi-way valve comprises an upper valve body, a lower valve body, and a rotary valve core, the lower valve body is provided with a chamber therein, the upper valve body is provided therein with a plurality of incoming oil channels which is penetrating into the chamber, the valve seat ring is provided in the rotary valve core and clings to a sealing surface of the upper valve body;

the valve seat ring includes a cylindrical body for fitting into the rotary valve core, and the body has a through-hole which is penetrating in an axial direction thereof and able to be communicated with the incoming oil channel, wherein a first annular boss is arranged on an outer wall of the body, and a second annular boss is arranged on an inner wall of the body; both an upper surface of the first annular boss and an upper surface of the second annular boss are flush with an upper surface of the body to form a sealing surface which clings to the sealing surface of the upper valve body in a sealed manner; an annular gap is formed between a lower surface of the first annular boss and the rotary valve core, so that the liquid in the chamber acts on the lower surface of the first annular boss to form a sealing load; and the liquid in the incoming oil channel acts on the lower surface of the second annular boss to form a sealing load.

Preferably, the cross-sectional shape of the oil incoming channel is circular in the multi-way valve, and the shapes of the first annular boss and the second annular boss are of an annular shape that adapts to the shape of the incoming oil channel.

Preferably, the cross-sectional shape of the horizontal section of the incoming oil channel is circular and the cross-sectional shape of the vertical section is of a fan-shape in the multi-way valve, wherein the shapes of the first annular boss and the second annular boss are of a fan shape that adapts to the cross-sectional shape of the vertical section of the incoming oil channel.

Preferably, the upper surface of the first annular boss is provided with at least one annular recess.

Preferably, there are 1 to 2 annular recesses.

Preferably, the cross-sectional shape of the annular recess is of a U-shape and the depth of the annular recess is 0.05 mm to 0.2 mm.

Preferably, the first annular boss and the second annular boss are integrally formed with the body.

The present invention also discloses a multi-way valve comprising an upper valve body, a lower valve body and a rotary valve core. The lower valve body is provided with a chamber therein, and the upper valve body is provided therein with a plurality of incoming oil channels penetrating into the chamber. The multi-way valve further comprises the valve seat ring described above, wherein the body of the valve seat ring is provided in the rotary valve core, and the sealing surface of the valve seat ring clings to the sealing surface of the upper valve body in a sealed manner.

Compared with the prior art, the valve seat ring of the present invention and the multi-way valve having the valve seat ring have the following advantages:

1. Since the valve seat ring of the present invention are additionally provided with the first annular boss and the second annular boss, when performing the internal sealing leakage test on the multi-way valve either by applying pressure to the chamber via the gathering and transportation orifice or by applying pressure to the incoming oil channel via the metering orifice, the liquid in the chamber generates an acting force acting on the lower surface of the first annular boss or the liquid in the incoming oil channel generates an acting force acting on the lower surface of the second annular boss, thus, an upward load hydraulically acting on the valve seat ring is formed, realizing hydraulic self-adaptability sealing for the valve seat ring and increasing the sealing pressure ratio of the valve seat ring.

2. Since the valve seat ring sealing surface of the valve seat ring of the present invention is provided with an annular recess, the area of the contact sealing between the upper valve body and the valve seat ring is reduced, and the sealing pressure ratio is increased, therefore, the shaft core moment is reduced, and under the condition that the sealing differential-pressure (DP) is 6.9 MPa/1000 psi (or even higher), the valve seat ring attains the leakage level of ANSI FCI-70.2 VI. Besides, the depth of the annular recess on the sealing surface of the valve seat ring is controlled to be in the range of 0.05 mm~0.2 mm, and it does not contribute to the sealing area, moreover, the crude oil with high sediment concentration will not affect the rotating motion operation of the valve seat ring.

3. The multi-way valve of the present invention has a reasonable structure, smooth operation, reduced driving moment and meets the requirement of sealing level under high differential-pressure, broadening the application field of the multi-way valve of the high-pressure oil well or high pressure gas well plane hard seal.

Figure 1:
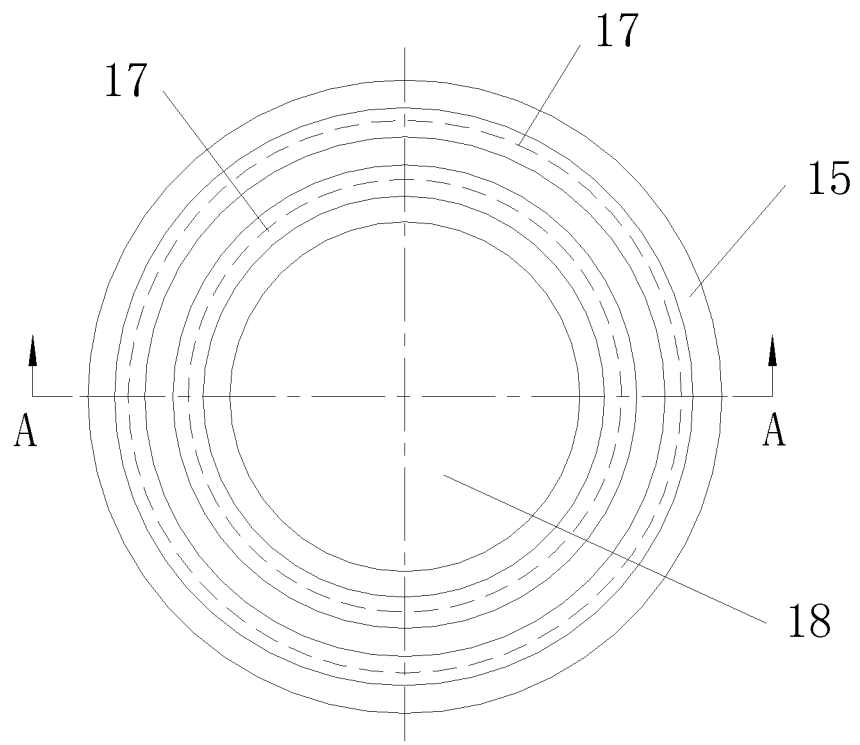
FIG. 1 is a plan view of a valve seat ring according to Embodiment 1 of the present invention.

| Description of the Reference Numerals | |
|---|---|
| 1-upper valve body | 2-lower valve body |
| 3-rotary valve core | 4-chamber |
| 5-incoming oil channel | 6-metering orifice |
| 7-gathering and transportation orifice | 8-valve seat ring |
| 9-first sealing surface | 10-body |
| 11-outer wall | 12-inner wall |
| 13-first annular boss | 14-second annular boss |
| 15-second sealing surface | 16-annular gap |
| 17-annular recess | 18-through-hole |
| 19-disc spring | |

DETAILED DESCRIPTION

The invention will now be described in further detail with reference to the accompanying drawings and the specific embodiment, which should not be construed as limitations to the invention.

Embodiment 1

Figure 3:
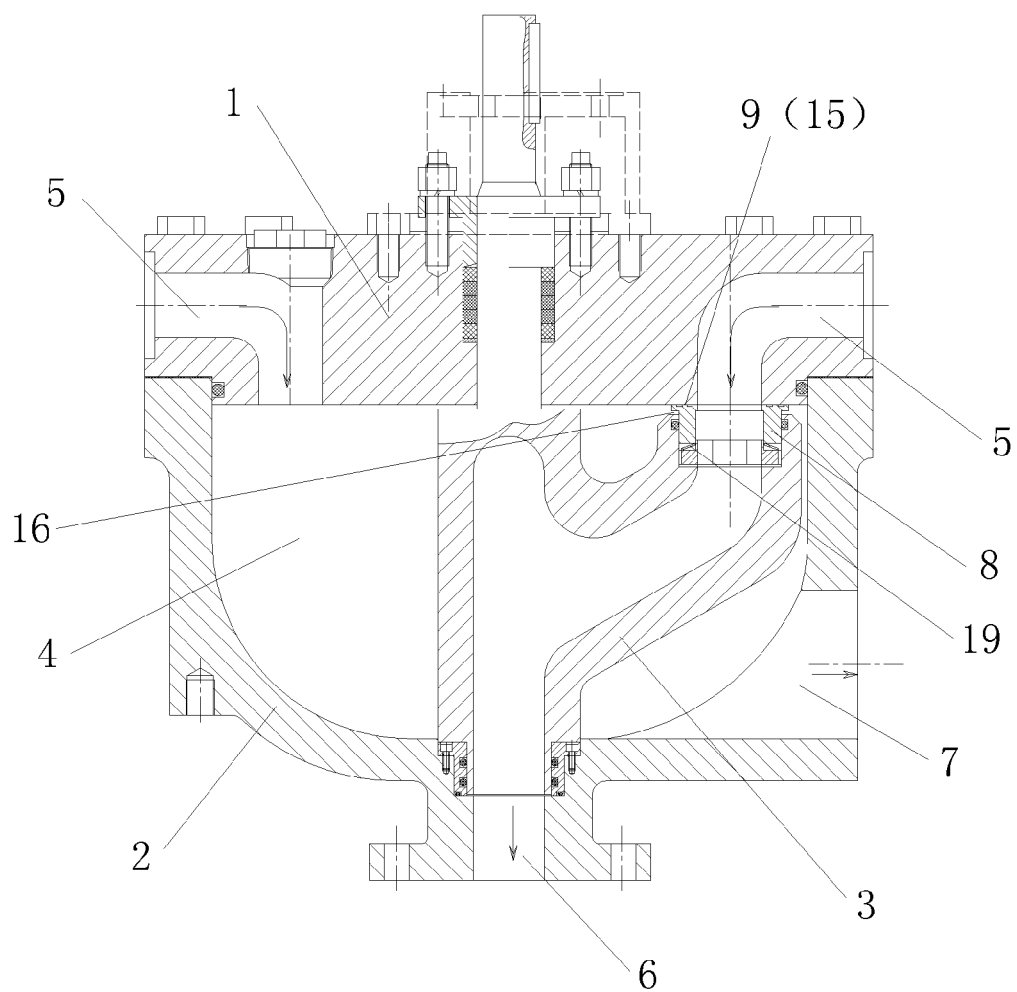
FIG. 3 is a longitudinal cross-sectional view of a multi-way valve having the valve seat ring according to Embodiment 1 of the present invention.

The valve seat ring of the embodiment of the present invention is applied to a multi-way valve. The cross-sectional shape at any position of an incoming oil channel of the multi-way valve in the present embodiment is circular. As shown in FIG. 3, the multi-way valve includes an upper valve body 1, a lower valve body 2, and a rotary valve core 3. The lower valve body 2 is provided with a chamber 4 therein, and the upper valve body 1 is provided with a plurality of incoming oil channels 5 which are penetrating into the chamber 4. The lower valve body 2 is provided with a metering orifice 6 and a gathering and transportation orifice 7, wherein the metering orifice 6 is able to communicate with the incoming oil channel 5 through a chamber in the rotary valve core 3, and the gathering and transportation orifice 7 communicates with the chamber 4. The valve seat ring 8 of the present embodiment is disposed in the rotary valve core 3 and clings to with a sealing surface of the upper valve body 1, and now the sealing surface of the upper valve body 1 is defined as the first sealing surface 9.

Figure 2:
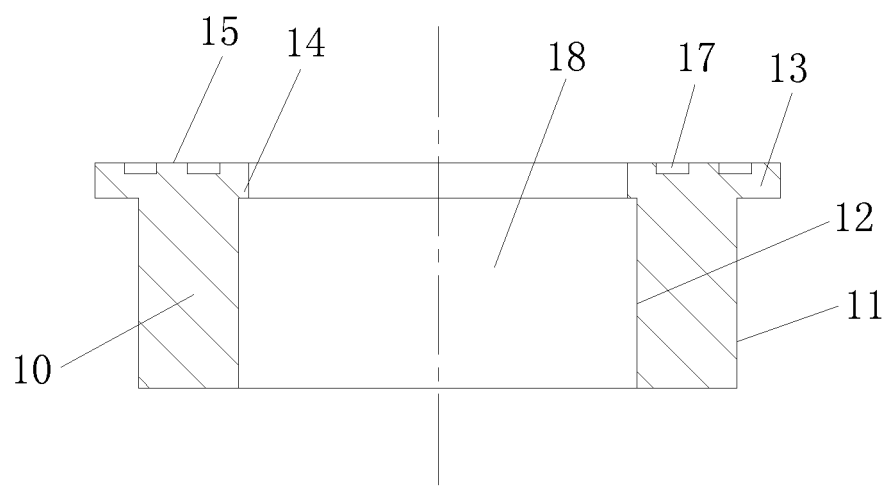
FIG. 2 is a cross-sectional view taken along the line A-A in FIG. 1.

As shown in FIGS. 1 and 2, the valve seat ring 8 of the embodiment of the present invention includes a cylindrical body 10 for fitting into the rotary valve core 3. The body 10 has a through-hole 18 penetrating in an axial direction thereof. A first annular boss 13 is arranged on an outer wall 11 of the body 10, while a second annular boss 14 is arranged on an inner wall 12 of the body 10; Both an upper surface of the first annular boss 13 and an upper surface of the second annular boss 14 are flush with an upper surface of the body 10 to form a second sealing surface 15 which clings to the first sealing surface 9 of the upper valve body 1 in a sealed manner; and an annular gap 16 is formed between a lower surface of the first annular boss 13 and the rotary valve core.

With continued reference to FIG. 1, when a high pressure fluid is introduced into the chamber 4 via the gathering and transportation orifice 7 for internal sealing leakage test, the high pressure liquid in the chamber 4 acts on the lower surface of the first annular boss 13 so that an upward force is applied to the valve seat ring 8, and this acting force forms the sealing load of the valve seat ring 8 so as to realize the hydraulic adaptability for sealing the valve seat ring 8, thereby increasing the contact sealing pressure ratio of the valve seat ring 8 and thus meeting the requirement of sealing in the multi-way valve at the leakage level of sealing Level VI under a high differential-pressure. When the high pressure liquid is introduced into the incoming oil channel 5 via the metering orifice 6 for internal sealing leakage test, the high pressure liquid in the incoming oil channel 5 acts on the lower surface of the second annular boss 14, so that an upward force is applied to the valve seat ring 8, and this acting force forms the sealing load of the valve seat ring 8 so as to realize the hydraulic adaptability for sealing the valve seat ring 8, thereby increasing the contact sealing pressure ratio of the valve seat ring 8 and thus meeting the requirement of sealing in the multi-way valve at the leakage level of sealing level VI under a high differential-pressure. In this way, the adaptability for sealing the valve seat ring 8 is formed both in the direction from the gathering and transportation orifice 7 to the chamber 4 and the direction from the metering orifice 6 to the incoming oil channel 5, wherein when the differential-pressure (DP) between the gathering and transportation orifice 7 and the metering orifice 6 becomes larger increasingly, the sealing pressure ratio will become larger, and the sealing leakage will become smaller accordingly.

Since the cross-sectional shape of the incoming oil channel 5 of the multi-way valve in the present embodiment is circular, therefore, the shapes of the first annular boss 13 and the second annular boss 14 are circular, which adapts to the shape of the incoming oil channel 5, as shown in FIGS. 1 and 2.

With continued reference to FIGS. 1 and 2, with the arrangement of the first annular boss 13, a sealing contact area between the first sealing surface 9 and the second sealing surface 15 increases, i.e., the sealing annular band is relatively wide. This will result in a relatively large rotational moment for driving the rotary valve core 3. Therefore, as shown in FIGS. 1 and 2, the upper surface of the first annular boss 13 is provided with at least one annular recess 17 and it does not contribute to the sealing area so as to reduce the sealing contact area. The number and the width of the annular recess 17 should be determined in accordance with the area of the upper surface of the first annular boss 13. If the area of the upper surface is large, the number of the annular recess 17 should increase correspondingly, and vice versa. Normally, the sealing contact area between the first sealing surface 9 and the second sealing surface 15 should be made to correspond to the sealing contact area of a traditional low pressure multi-way valve, in order to ensure that the rotational moment for driving the rotary valve core 3 is not too large. In this embodiment, two annular recesses 17 are provided.

As a further preferred embodiment of the present embodiment, the cross-sectional shape of the annular recess 17 is of a U-shape, and the depth of the annular recess 17 is 0.05 mm to 0.2 mm. Since the depth of the annular recess 17 is relatively small, the sand particles in crude oil with high sediment concentration do not remain in the annular recess 17, thereby not affecting the rotary motion operation of the valve seat ring 8.

Embodiment 2

Figure 4:
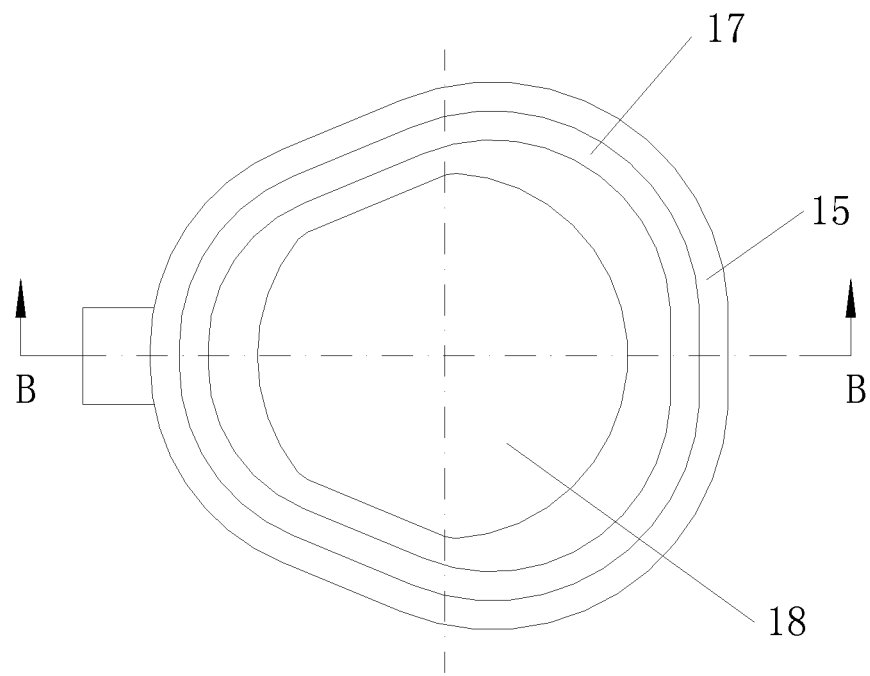
FIG. 4 is a plan view of a valve seat ring according to Embodiment 2 of the present invention.
Figure 5:
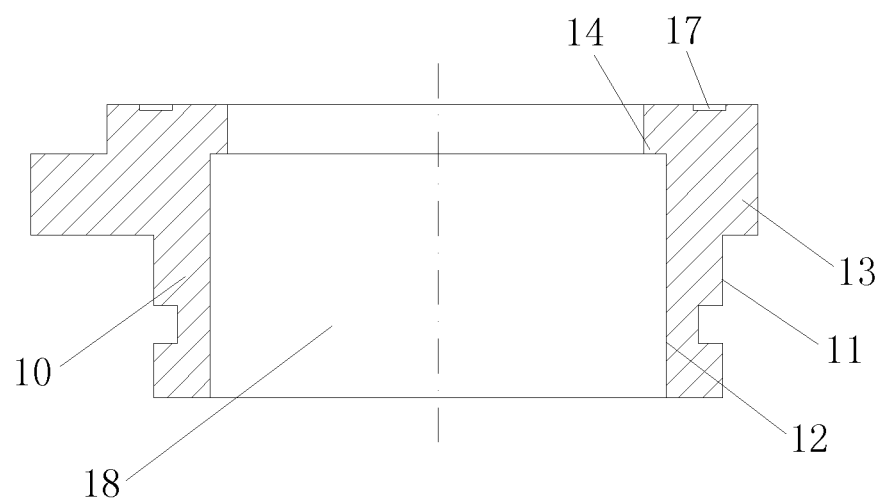
FIG. 5 is a cross-sectional view taken along the line B-B of FIG. 4.

The principle of the present embodiment is completely the same as that of the Embodiment 1 except the following difference: because the multi-way valves employed are different, the cross-sectional shape of the horizontal section (the section for connecting with a single well) of the incoming oil channel 5 of the multi-way valve of the present embodiment is circular, while the cross-sectional shape of the vertical section (the section for docking with the rotary valve core 3) has a fan shape. In order to adapt to the vertical section of the incoming oil channel 5 of the multi-way valve, the shapes of the first annular boss 13 and the second annular boss 14 are different from that of Embodiment 1. As shown in FIGS. 4 and 5, the body 10 of the valve seat ring 8 of the present embodiment is also of a cylindrical shape as in Embodiment 1, and has a penetrating through-hole 18, wherein the body 10 is for mating with the rotary valve core 3. Both the first annular boss 13 and the second annular boss 14 are of fan shapes which adapt to the cross-sectional shape of the vertical section of the incoming oil channel 5, such as, a fan-shape similar to a cattail leaf fan, as shown in FIG. 4.

Figure 6:
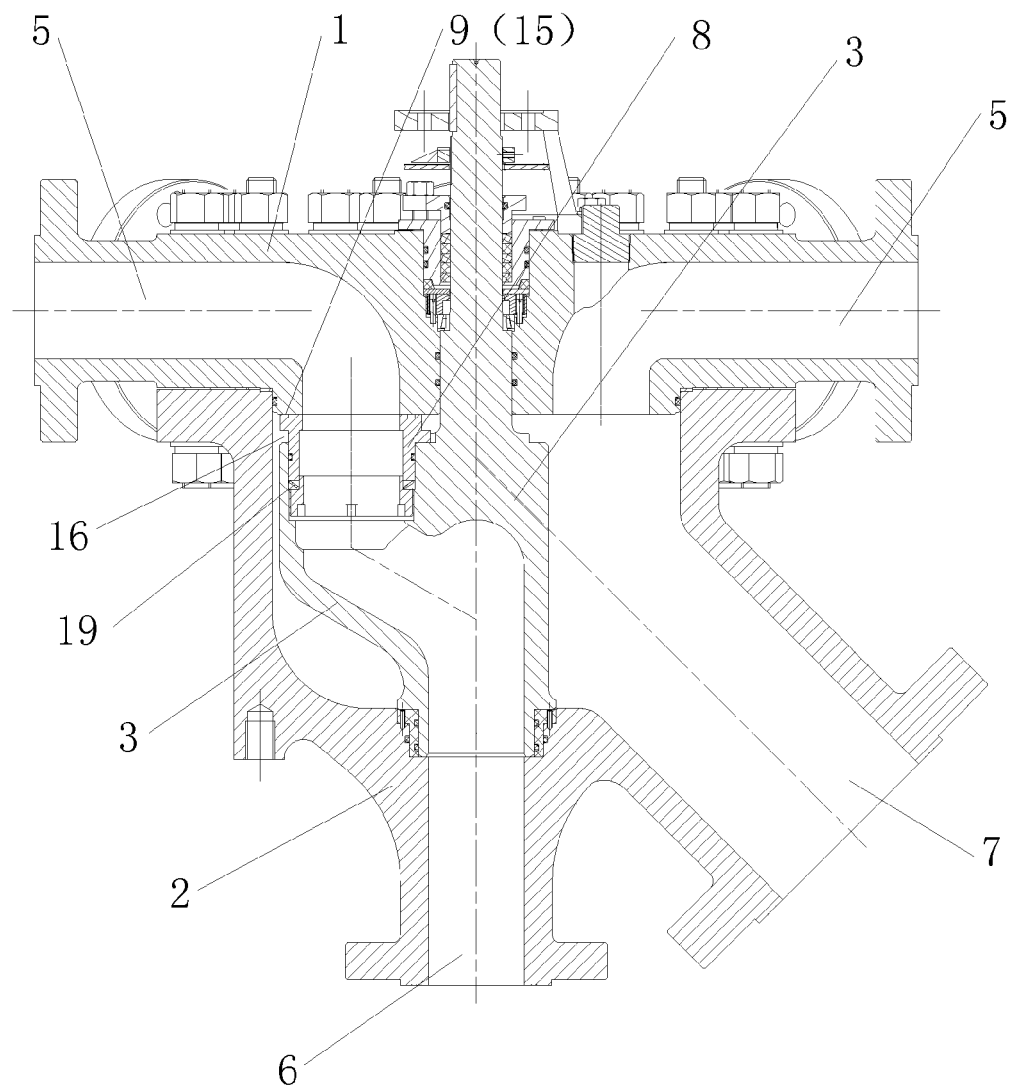
FIG. 6 is a longitudinal cross-sectional view of a multi-way valve having the valve seat ring according to Embodiment 2 of the present invention.

The present invention also discloses a multi-way valve as shown in FIGS. 3 and 6, including an upper valve body 1, a lower valve body 2, a rotary valve core 3, and the valve seat ring 8 as described above. A chamber 4 is provided in the lower valve body 2, and a plurality of incoming oil channels 5 penetrating into the chamber 4 are provided in the upper valve body 1. A body 10 of the valve seat ring 8 is arranged in the rotary valve core 3, and the second sealing surface 15 of the valve seat ring 8 clings to the first sealing surface 9 of the upper valve body 1 in a sealed manner.

Since the internal sealing differential-pressure (DP) required by the traditional low pressure multi-way valve is relatively low, it is sufficient to provide the sealing pressure ratio of the valve seat ring 8 to the upper valve body 1 by the disc spring 19 below the valve seat ring. As for the internal sealing of a high-end high-pressure multi-way valve, when the internal sealing differential-pressure (DP) reaches 6.9 MPa/1000 psi (or even higher), providing the sealing pressure ratio of the valve seat ring 8 to the upper valve body 1 only by the disc spring 19 below the valve seat ring is not enough to meet the leakage level of level VI. In the present invention, by changing the structure of the valve seat ring 8, with the hydraulically acting force in the chamber 4 or the incoming oil channel 5, sealing load hydraulically acting on the valve seat ring 8 is formed, thus, the hydraulic self-adaptability sealing of the valve seat ring 8 is realized, and the contact sealing pressure ratio of the valve seat ring 8 is increased, thereby meeting the requirement for internal sealing of high pressure multi-way valve at the leakage level of sealing level VI under a high differential-pressure (DP). Therefore, the valve seat ring 8 of the present invention has a reasonable design on structure, which improves the sealing level under a high differential-pressure (DP), reduces the driving moment of the rotary valve core 3, reduces the power of the selected driving electronic assembly, and broadens high pressure application field of the high-pressure oil well or high pressure gas well plane hard seal multi-way valve.

The above embodiments are merely exemplary embodiments of the present invention and are not intended to limit the invention, while the protection scope is defined by the claims. Various modifications or equivalent substitutions may be made to the invention within the spirit and scope of the invention by those skilled in the art, and such modifications and equivalent substitutions should be considered as being within the scope of the invention.

The invention claimed is:

1. A valve seat ring for use in a multi-way valve, comprising:
an upper valve body, a lower valve body, and a rotary valve core, the lower valve body is provided with a chamber therein, the upper valve body is provided with a plurality of incoming oil channels which penetrate into the chamber, the valve seat ring is provided in the rotary valve core and clings to a sealing surface of the upper valve body, wherein,
the valve seat ring includes a cylindrical body for fitting into the rotary valve core, and the cylindrical body has a through-hole, which penetrates in an axial direction thereof and is able to be communicated with the incoming oil channel, wherein a first annular boss is arranged on an outer wall of the cylindrical body, and a second annular boss is arranged on an inner wall of the cylindrical body; both an upper surface of the first annular boss and an upper surface of the second annular boss are flush with an upper surface of the cylindrical body to form a sealing surface which clings to the sealing surface of the upper valve body in a sealed manner; an annular gap is formed between a lower surface of the first annular boss and the rotary valve core, the annular gap exposing to liquid in the chamber so that the liquid acts on the lower surface of the first annular boss to form a sealing load; and a lower surface of the second annular boss exposes to liquid in the incoming oil channel so that the liquid acts on the lower surface of the second annular boss to form a sealing load.

2. The valve seat ring according to claim 1, wherein, the cross-sectional shape of the oil incoming channel is circular in the multi-way valve, and the shapes of the first annular boss and the second annular boss are of an annular shape that adapts to the shape of the incoming oil channel.

3. The valve seat ring according to claim 1, wherein, the cross-sectional shape of a horizontal section of the incoming oil channel is circular and the cross-sectional shape of a vertical section of the incoming oil channel is of a fan-shape in the multi-way valve, wherein the shapes of the first annular boss and the second annular boss are of a fan shape that adapts to the cross-sectional shape of the vertical section of the incoming oil channel.

4. The valve seat ring according to claim 1, wherein, the upper surface of the first annular boss is provided with at least one annular recess.

5. The valve seat ring according to claim 4, wherein, there are 1 to 2 annular recesses.

6. The valve seat ring according to claim 4, wherein, the cross-sectional shape of the annular recess is of a U-shape and the depth of the annular recess is 0.05 mm to 0.2 mm.

7. The valve seat ring according to claim 1, wherein, the first annular boss and the second annular boss are integrally formed with the cylindrical body.

8. A multi-way valve comprising an upper valve body, a lower valve body, and a rotary valve core, the lower valve body is provided with a chamber therein, the upper valve body is provided with a plurality of incoming oil channels penetrating into the chamber, wherein, the multi-way valve further comprises the valve seat ring according to claim 1, wherein the cylindrical body of the valve seat ring is arranged in the rotary valve core, and the sealing surface of the valve seat ring clings to the sealing surface of the upper valve body in a sealed manner.

\* \* \* \* \*